(12) United States Patent
Bezalel et al.

(10) Patent No.: US 10,013,242 B2
(45) Date of Patent: Jul. 3, 2018

(54) DISTRIBUTED COMPILATION OF STATICALLY TYPED LANGUAGES

(71) Applicant: Hewlett Packard Enterprise Development LP, Houston, TX (US)

(72) Inventors: Amit Bezalel, Yehud (IL); Elad Benedict, Yehud (IL); Ohad Assulin, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/302,290

(22) PCT Filed: May 27, 2014

(86) PCT No.: PCT/US2014/039581
§ 371 (c)(1),
(2) Date: Oct. 6, 2016

(87) PCT Pub. No.: WO2015/183241
PCT Pub. Date: Dec. 3, 2015

(65) Prior Publication Data
US 2017/0031662 A1 Feb. 2, 2017

(51) Int. Cl.
*G06F 9/45* (2006.01)
*G06F 8/41* (2018.01)

(52) U.S. Cl.
CPC ............... *G06F 8/433* (2013.01); *G06F 8/41* (2013.01); *G06F 8/447* (2013.01)

(58) Field of Classification Search
None
See application file for complete search history.

(56) References Cited

U.S. PATENT DOCUMENTS

| | | | |
|---|---|---|---|
| 7,509,633 B2 | 3/2009 | Nesbitt et al. | |
| 8,201,157 B2 | 6/2012 | Wagner et al. | |
| 8,464,237 B1 | 6/2013 | Taylor | |
| 8,978,010 B1* | 3/2015 | Thumfart | G06F 8/433 |
| | | | 717/123 |
| 2002/0133809 A1* | 9/2002 | Hills | G06F 8/41 |
| | | | 717/136 |

(Continued)

OTHER PUBLICATIONS

Abdelrahman, S.E., et al., "Disblue+: A Distributed Annotation-based C# Compiler," Egyptian Informatics Journal, Cairo University, Jun. 2010, vol. 11; Issue: 1; On pp. 1-10.

(Continued)

*Primary Examiner* — Daxin Wu

(57) ABSTRACT

Examples relate to providing distributed compilation of statically typed languages. In some examples, first order dependencies of a target module are identified, where each of the first order dependencies is associated with one of a number of dependent modules. Next, each first order dependency of is traversed to remove code references from source code of a corresponding module of the plurality of dependent modules, where each of the code references refers to a type defined in an indirect dependency of the target module, and compile the source code of the corresponding module to generate a module stub of a number of module stubs. At this stage, source code of the target module is compiled using the module stubs to generate a target program.

16 Claims, 5 Drawing Sheets

(56) References Cited

U.S. PATENT DOCUMENTS

| | | | |
|---|---|---|---|
| 2007/0162903 A1* | 7/2007 | Babb, II | G06F 8/75 717/154 |
| 2008/0134156 A1* | 6/2008 | Osminer | G06F 9/44589 717/140 |
| 2009/0172652 A1* | 7/2009 | Simon | G06F 8/443 717/148 |
| 2011/0307869 A1 | 12/2011 | Cwalina et al. | |
| 2013/0024849 A1 | 1/2013 | Baba | |
| 2014/0019949 A1* | 1/2014 | Craymer | G06F 8/443 717/150 |
| 2014/0173574 A1* | 6/2014 | Schmidt | G06F 8/427 717/143 |

OTHER PUBLICATIONS

Hejlsberg, A., et al., "Anders on C# 6.0 at Build 2013", Smart Software Musings on Technology, Entrepreneurship and Life, Jul. 14, 2013, 5 pages.

Korean Intellectual Property Office, International Search Report and Written Opinion, dated Feb. 17, 2015, 10 pages, Daejeon Metropolitan City, Republic of Korea.

Yuan Yu et al., DryadLINQ: A System for General-Purpose Distributed Data-Parallel Computing Using a High-Level Language, 8th USENIX Symposium on Operating Systems Design and Implementation 2008 15 pages.

* cited by examiner

DISTRIBUTED COMPILATION OF STATICALLY TYPED LANGUAGES

BACKGROUND

Compilation transforms source code written in a programming language into another computer language that is typically in a binary form (i.e., object code). Compilation typically occurs frequently and is triggered on each developer's machine, as a part of continuous integration, on a nightly build server, etc. Parallel compilation is a technique that allows for different portions of the source code to be compiled in parallel on different computing devices. Some programming languages (e.g. C, C++) facilitate parallel compilation by providing metadata (i.e., declarations) that is separate from the implementation, which allows a module to be compiled against another module's metadata before that other module is compiled.

BRIEF DESCRIPTION OF THE DRAWINGS

The following detailed description references the drawings, wherein.

DETAILED DESCRIPTION

Figure 1:
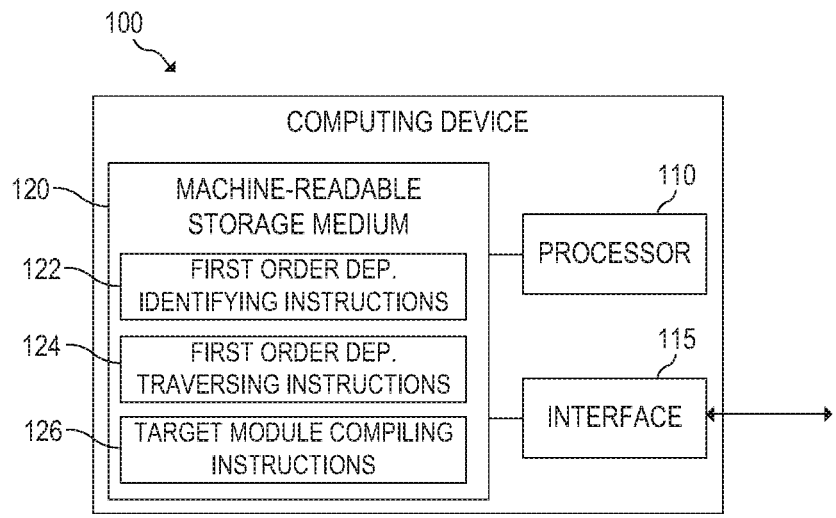
FIG. 1 is a block diagram of an example computing device for providing distributed compilation of statically typed languages.

As discussed above, some programming languages facilitate parallel compilation by having separate metadata. Other programming languages such as C# have metadata that is coupled to the implementation, which may be compiled into an assembly. The assembly can then be used as a dependency for the compilation of another module. Accordingly, when compiling a module in a coupled programming language, a dependency to an assembly recursively triggers the compilation of the entire dependency tree, which describes the dependencies to assemblies of the module to be compiled. For example, a dependency tree may specify that the module is dependent on a number of assemblies that should be initially compiled before the module can be compiled. The dependencies of a module may be maintained as references to projects of the dependent assemblies, where the projects are used to generate the compiled dependencies.

Examples described herein separate a coupled programming language's metadata from its implementation in order to enable parallel compilation. Specifically, the examples describe the creation of module stubs, which includes the same metadata as the project that is used to compile the dependency. However, creating naïve stubs for a dependent module (i.e., replacing all its public method implementations with degenerate ones and removing private fields/classes/methods, etc.) is not sufficient because the dependent module's metadata itself may dependent of other assemblies, which in turn have their own dependencies and so on. For example, a dependent module may include a public method with a parameter that is of a type defined in another assembly.

Given a list of modules (i.e., solution) with dependencies between the modules, its induced dependency graph is processed to generate the module stubs. If a target module uses some type defined in another module, the target module is dependent on that other module. Thus, removing all code references to non-first order dependencies of a target module from its first order dependencies does not remove any of the target module's dependent types from the first order dependencies. In this case, the first order dependencies' metadata for the target module is semantically equivalent to the initial dependency graph with respect to the target module's compilation.

Examples disclosed herein provide distributed compilation of statically typed languages. In some examples, first order dependencies of a target module are identified, where each of the first order dependencies is associated with one of a number of dependent modules. Next, each first order dependency of is traversed to remove code references from source code of a corresponding module of the plurality of dependent modules, where each of the code references refers to a type defined in an indirect dependency of the target module, and compile the source code of the corresponding module to generate a module stub of a number of module stubs. At this stage, source code of the target module is compiled using the module stubs to generate a target program.

In this manner, examples disclosed herein improve distributed compilation of statically typed languages by using module stubs to compile a target module. Specifically, first order dependencies of the target module are traversed to remove indirect code references from the first order dependencies and then compiled to generate the module stubs, which are used to compile the target module.

Referring now to the drawings, FIG. 1 is a block diagram of an example computing device 100 for providing distributed compilation of statically typed languages. Computing device 100 may be any computing device (e.g., server, distributed system, desktop computer, etc.) with access to source code. In the example of FIG. 1, computing device 100 includes a processor 110, an interface 115, and a machine-readable storage medium 120.

Processor 110 may be any number of central processing units (CPUs), microprocessors, and/or other hardware devices suitable for retrieval and execution of instructions stored in machine-readable storage medium 120. Processor 110 may fetch, decode, and execute instructions 122, 124, 126 to provide distributed compilation of statically typed languages, as described below. As an alternative or in addition to retrieving and executing instructions, processor 110 may include any number of electronic circuits comprising a number of electronic components for performing the functionality of instructions 122, 124, and/or 126.

Interface 115 may include a number of electronic components for communicating with networked devices. For example, interface 115 may be an Ethernet interface, a Universal Serial Bus (USB) interface, an IEEE 1394 (Firewire) interface, an external Serial Advanced Technology Attachment (eSATA) interface, or any other physical connection interface suitable for communication with the distributed database system. Alternatively, interface 115 may be a wireless interface, such as a wireless local area network (WLAN) interface or a near-field communication (NFC) interface. In operation, as detailed below, interface 115 may be used to send and receive data to and from a corresponding interface(s) of networked devices.

Machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for providing distributed compilation of statically typed languages.

First order dependency identifying instructions 122 performs a static analysis of source code to identify first order dependencies of a target module. A first order dependency of the target module includes at least one defined type that is referenced directly in the target module. Specifically, the metadata of the source code is processed to identify the first order dependencies. Further, the first order dependencies of the target module can be topologically sorted to ensure that dependencies between the first order dependencies are properly resolved when module stubs are generated as described below. For example, if a first order dependency is referenced from another first order dependencies, the first order dependency should be compiled before the other first order dependency to ensure that application programming interface (API) declarations or changes in the first order dependency are reflected in the other first order dependency. The source code of the target module is written in a statically typed language that reveals the type of each variable during compilation.

First order dependency traversing instructions 124 traverses the first order dependencies of the target module to generate module stubs. Source code for each of the first order dependencies are processed in topological order (i.e., according to a module topology) to (1) remove code references to any type defined in the source code that isn't a direct dependency of the target module (i.e., indirect dependencies) and (2) compile the modified source code to generate a module stub. A module stub still includes all the defined types that are directly referenced by the target module, which allows the module stub to be substituted for the compiled dependency when compiling the target module. Further, because all references to indirect dependencies are removed, the indirect dependencies can be ignored during the compilation of the mobile stub.

Target module compiling instructions 126 compile the target module using the module stubs generated as described above. The module stubs allow the target module to be compiled without performing a full compilation of the first order dependencies. Further, requests may be sent to networked devices to compile each of the first order dependencies in parallel. In this case, the overall compilation of the target module and its dependencies can be shortened by orders of magnitude.

Figure 2:
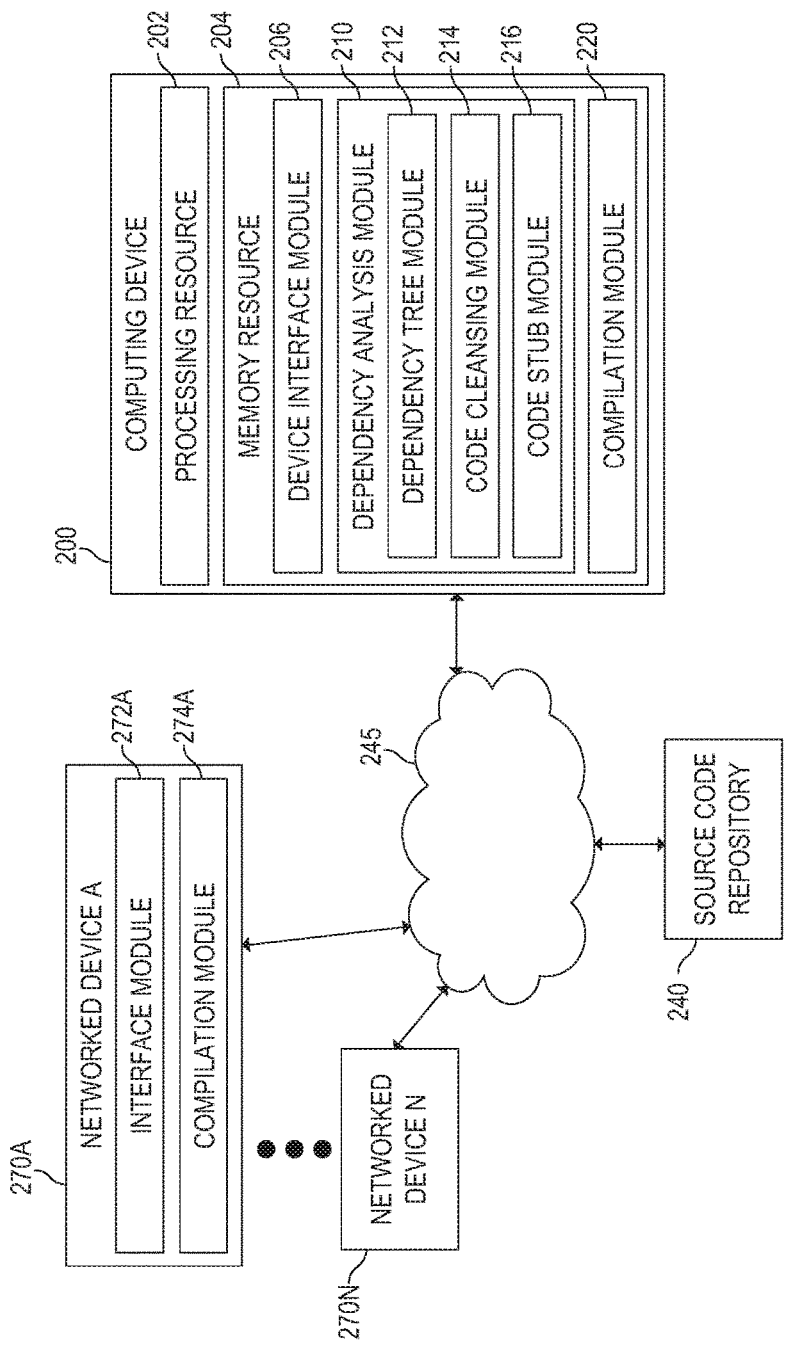
FIG. 2 is a block diagram of an example computing device in communication with networked devices and a source code repository for providing distributed compilation of statically typed languages.

FIG. 2 is a block diagram of an example computing device 200 in communication with networked devices 270A, 270N and a source code repository 240 for providing distributed compilation of statically typed languages. As illustrated, computing device 200 may include processing resource 202 and memory resource 204.

Processing resource 202 may be any number of central processing units (CPUs), microprocessors, processor cores, and/or other hardware devices suitable for retrieval and execution of instructions stored in memory resource 204. Memory resource 204 may be any electronic, magnetic, optical, or other physical storage device that stores executable instructions such as RAM, EEPROM, a storage drive, an optical disc, etc. As described in detail below, memory resource 204 may be encoded with modules for providing distributed compilation of statically typed languages. In FIG. 2, processing resource 202 and memory resource are components of a single computing device 200. Alternatively, processing resource 202 and/or memory resource 204 may be distributed across any number of computing devices in a distributed system.

Memory resource 204 includes a number of modules 206-220. Each of the modules may include a series of instructions encoded on memory resource 204 and executable by processing resource 202 of the computing device 200. In addition or as an alternative, each module may include any number of hardware devices including electronic circuitry for implementing the functionality described below.

Similar to computing device 100 of FIG. 1, computing device 200 may be a server, distributed system, desktop computer, or any other device suitable for executing the functionality described below. As detailed below, computing device 200 may include a series of modules 206-220 for providing distributed compilation of statically typed languages.

Device interface module 206 may manage communications with the networked devices 270A, 270N. Specifically, the node interface module 206 may initiate connections over network 245 with the networked devices 270A, 270N and then send compilation requests and receive compiled dependencies to/from the networked devices 270A, 270N.

Dependency analysis module 210 perform dependency analysis of source code. Further, although the components of file dependency analysis module 210 are described in detail below, additional details regarding an example implementation of module 210 are provided above in connection with instructions 122 and 124 of FIG. 1.

Dependency tree module 212 may be configured to analyze source code of a target module to create a dependency tree. The dependency tree describes the module dependencies of the target module, which includes direct (i.e., first order) and indirect dependencies of the target module. Target module is directly dependent on a direct module if the target module refers to a type that is defined in the direct module. Target module is indirectly dependent on an indirect module if one of target module's direct dependencies includes a type that is defined in the indirect module, where target module does not include a types defined in the indirect module. Dependency tree module 212 analyzes the source code of the target module to extract metadata that describes its dependencies. The source code of each of the dependencies can then be analyzed to extract metadata describing their dependencies and so on until the source code of the target module and all dependencies has been analyzed to extract the metadata. Dependency tree module 212 uses the metadata to create the dependency tree for target module. An example dependency tree is described below with respect to FIG. 6.

Code cleansing module 214 is configured to use the dependency tree to cleanse the code of the first order dependencies of the target module. Specifically, the source code of each of the first order dependencies is traversed to remove type references that are not in first order dependencies of the target module (i.e., remove type references to indirect dependencies of the target module). Removing type references to indirect dependencies removes code that is irrelevant to the compilation of the target module.

Code stub module 216 compiles the cleansed source code of the first order dependencies to generate module stubs. Because the module stubs still include type references of the first order dependencies, the module stubs are semantically equivalent to the uncleansed modules with regard to the target module's compilation. In other words, each module stub includes the same public classes, methods, etc. that are (1) exposed by a corresponding uncleansed module and (2) used by the target module. Further, code stub module 216 is configured to generate the module stubs in the correct topological order so that inter-module dependencies between the first order dependencies (i.e., one first order dependency being dependent on another first order dependency) are accounted for. Specifically, if a first order dependency is dependent on another first order dependency, the other first order dependency should be compiled into a module stub first so that API declarations or changes in the other first order dependency are correctly reflected in a module stub of the first order dependency.

Compilation module 220 is configured to compile the target module and manage the compilation of the target module's dependencies. Compilation module 220 compiles the target module using the module stubs generated by the code stub module 216. Thus, the compilation of the target module can be performed without compiling any of the dependencies of the target module. Compilation module 220 also manages the distribution of the target module's dependencies to networked devices 270A, 270N for parallel compilation. While only two networked devices are shown in FIG. 2, any number of networked devices can be included in a distributed compilation as described herein. Compilation module 220 may send a compilation request to each of the networked devices 270A, 270N to initiate the compilation of the target module's dependencies. In some cases, a compilation request may include the source code for the dependency to be compiled. In other cases, the compilation identifies the dependency to be compiled, and the networked device 270A, 270N obtains the source code from source code repository 240.

Source code repository 240 is configured to store source code for computing device 200 and networked devices 270A, 270N. In some cases, the devices 200, 270A, 270N may retrieve source code for analysis and compilation from source code repository 240. Alternatively, source code may be stored locally on some of the devices 200, 270A, 270N.

In FIG. 2, networked device A 270A shows modules 272A-274A, which also exist in networked device N 270N but are not shown to simplify the figure. Interface module 272A may manage communications with computing device 200. Specifically, the interface module 272A may receive compilation requests from computing device 200 and provide compiled dependencies in response.

Compilation module 274A processes compilation requests received from computing device 200. Specifically, compilation module 274A may obtain source code of a dependency to compile a corresponding compiled dependency. In some cases, compilation module 274A may be configured to further distribute the compilation of the dependencies of the dependency as described above with respect to computing device 200.

Figure 3:
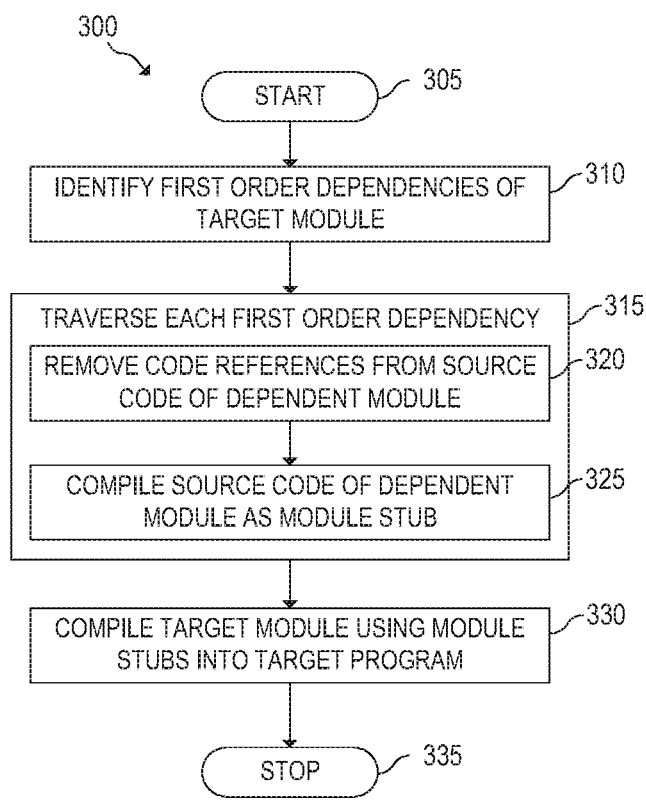
FIG. 3 is a flowchart of an example method for execution by a computing device for providing distributed compilation of statically typed languages.

FIG. 3 is a flowchart of an example method 300 for execution by a computing device 100 for providing distributed compilation of statically typed languages. Although execution of method 300 is described below with reference to computing device 100 of FIG. 1, other suitable devices for execution of method 300 may be used. Method 300 may be implemented in the form of executable instructions stored on a machine-readable storage medium, such as storage medium 120, and/or in the form of electronic circuitry.

Method 300 may start in block 305 and continue to block 310, where computing device 100 analyzes source code of a target module to identify first order dependencies. Specifically, the source code may be analyzed to create a dependency tree for the target module, where the dependency tree shows the first order dependencies. In block 315, computing device 100 traverses the first order dependencies of the target module to generate module stubs. Source code for each of the first order dependencies are processed in topological order to (1) remove code references to any type defined in the source code that isn't a direct dependency of the target module (i.e., indirect dependencies) in sub-block 320 and (2) compile the modified source code to generate a module stub in sub-block 325.

In block 330, computing device 100 compiles the target module using the module stubs generated in block 315. Further, requests may be sent to networked devices to compile each of the first order dependencies in parallel with the compilation of the target module. Method 300 may then continue to block 335, where method 300 may stop.

Figure 4:
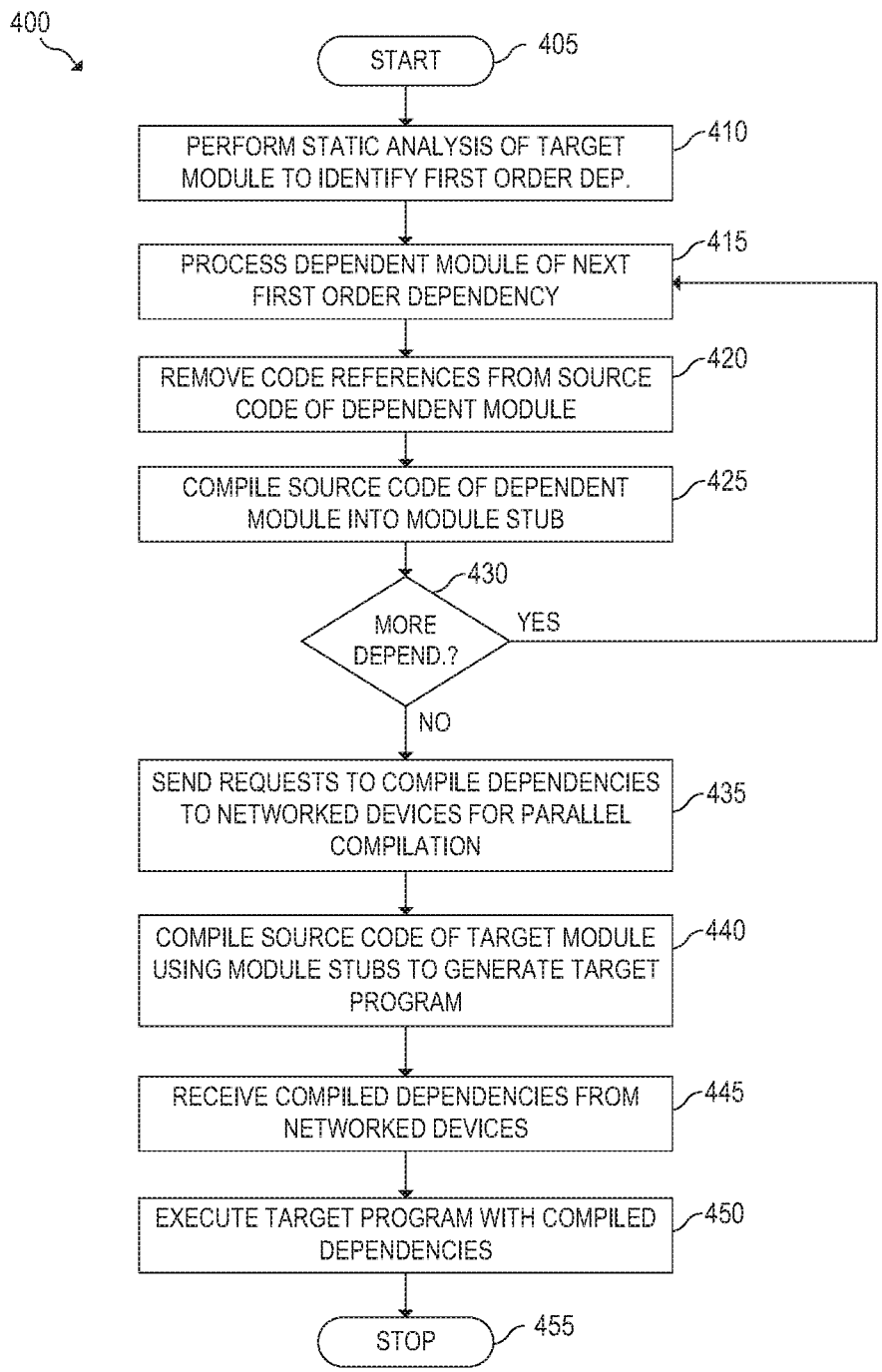
FIG. 4 is a flowchart of an example method for execution by a computing device for performing a static analysis of source code to enable parallel compilation of modules in a software application.

FIG. 4 is a flowchart of an example method 400 for execution by a computing device 200 for performing a static analysis of source code to enable parallel compilation of modules in a software application. Although execution of method 400 is described below with reference to computing device 200 of FIG. 2, other suitable devices for execution of method 400 may be used. Method 400 may be implemented in the form of executable instructions stored on a machine-readable storage medium and/or in the form of electronic circuitry.

Method 400 may start in block 405 and continue to block 410, where computing device 200 performs static analysis of a target module to identify first order dependencies. Specifically, the source code of the target module is analyzed to generate a dependency map that describes the dependencies of the target module. In block 415, the dependent module of the next first order dependency is processed. In this manner, each of the first order dependencies is processed in topological order as described above.

In block 420, the code references to indirect dependencies (i.e., all dependent modules that are not first order dependencies) of target module are removed from the dependent module. For example, a source code file of a first order dependency of the target module is shown below in TABLE 1:

TABLE 1 example source code file of first order dependency

```
public class Project_3_Class_A
{
    private Project_6_Class_X d1;
    public void Foo( )
    {
        d1 = new Project_6_Class_X( );
    }
    public int SomeProperty
    {
        get { return d1.Number; }
        set { dq.Number = value; }
    }
}
public class Project_3_Class_B : Project_6_Class_X
```

TABLE 1-continued example source code file of first order dependency

```
    {
        public bool Goo( )
        {
            return true:
        }
    }
```

In TABLE 1, Project_3_Class_A is referred to in the target module and is the reason the dependency is determined to be a first order dependency. Further, Project_6_Class_X is not referred to in the target module and, thus, its corresponding dependency is an indirect dependency. After cleansing indirect references from the example of TABLE 1, the resulting cleansed source code file is shown below in TABLE 2:

TABLE 2 example cleansed source code file of first order dependency

```
        public class Project_3_Class_A
        {
            public void Foo( )
            {
            }
            public int SomeProperty
            {
                get { return default(int); }
                set { }
            }
        }
```

As shown in TABLE 2, all references to Project_6_Class_X have been removed, including Project_3_Class_B that inherits from Project_6_Class_X.

The source code of the cleansed dependent module is then compiled to generate a module stub in block 425. In block 430, computing device 200 determines if there are more first order dependencies to process. If there are more first order dependencies, method 400 returns to block 415 to process the next first order dependency.

In block 435, a request to compile each of the first order dependencies is sent to a corresponding networked device for parallel compilation. In some cases, the request may include the source for the first order dependency to be compiled by the corresponding networked device. Alternatively, the corresponding networked device may retrieve the source code from a source code repository.

In block 440, the source code of the target module is compiled using the module stubs to generate a target program. The compilation of the target module is performed in parallel with the compilation of the first order dependencies on the networked devices. In block 445, the compiled first order dependencies are received from the networked devices. At this stage, the target program can be executed using the compiled dependencies in block 450. Method 400 may then continue to block 455, where method 400 may stop.

Figure 5:
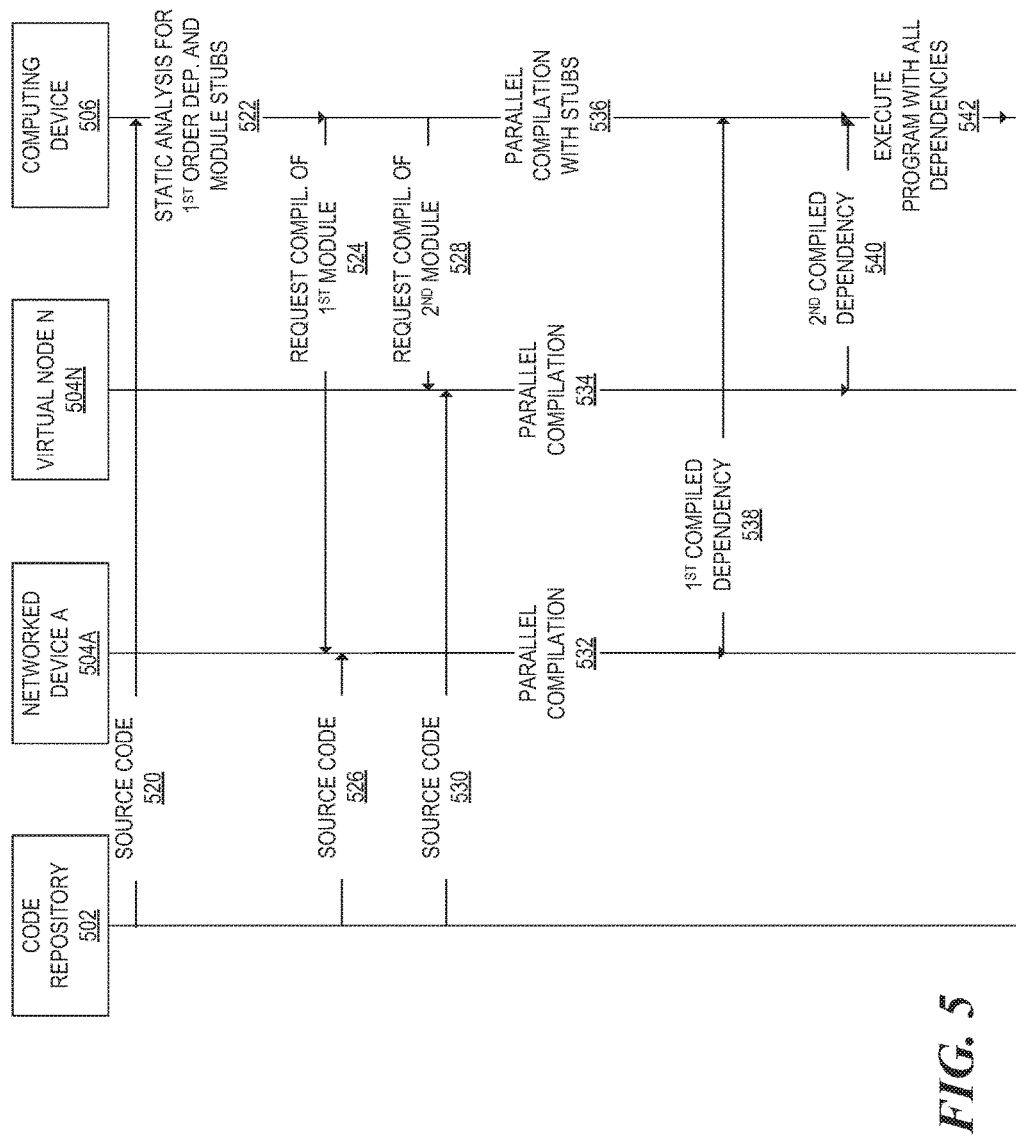
FIG. 5 is a workflow diagram showing an example system for providing distributed compilation of statically typed languages.

FIG. 5 is a workflow diagram showing an example system for providing distributed compilation of statically typed languages. Workflow diagram 500 shows a code repository 502, a network device A 504A, a networked device N 504N, and a computing device 506, which may each be similar to their corresponding components described above with respect to FIGS. 1 and 2.

In block 520, code repository 502 provides source code of a target module to the computing device 506. In block 522, the computing device 506 performs a static analysis of the source code to identify first order dependencies of the target module and to create module stubs for the first order dependencies. In block 524, computing device 506 requests networked device A 504A to compile a first direct dependency of the target module. In block 526, networked device A 504A obtains source code for the first direct dependency from the code repository 502. In block 528, computing device 506 requests networked device N 504N to compile a second direct dependency of the target module. In block 530, networked device N 504N obtains source code for the second direct dependency from the code repository 502.

In blocks 532, 534, and 536, the target module and its direct dependencies are compiled in parallel. Specifically in parallel, (1) computing device 506 compiles the target module using the module stubs generated in block 522 to generate a target program, (2) networked device A 504A compiles the first direct dependency; and (3) networked device N 504N compiles the second direct dependency. In block 538, networked device A 504A provides the first compiled dependency to computing device 506, and in block 540, networked device N 504N provides the second compiled dependency to computing device 506. In block 542, computing device 506 can execute the target program using the compiled dependencies from the networked devices 504A, 504N.

Figure 6:
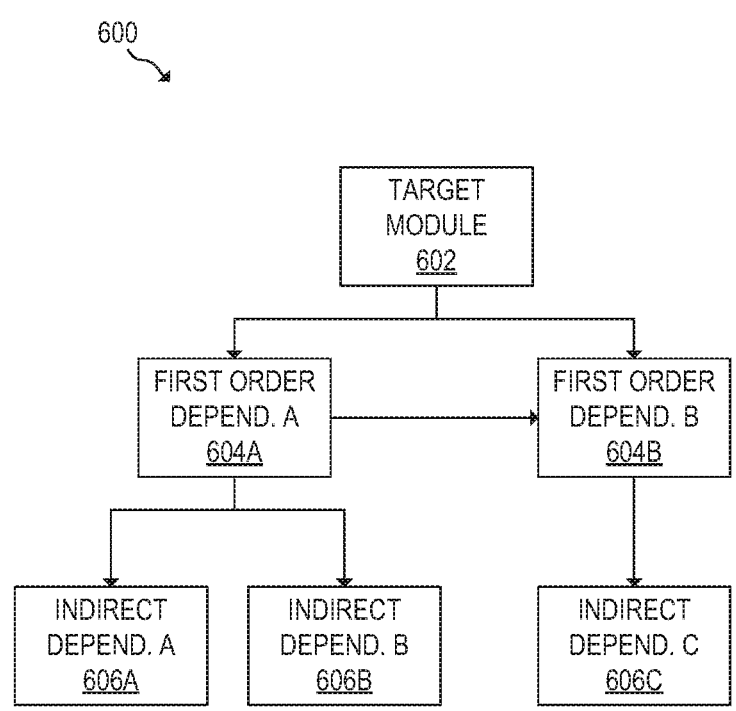
FIG. 6 is an example dependency tree to be used for distributed compilation of statically typed languages.

FIG. 6 is an example dependency tree 600 to be used for distributed compilation of statically typed languages. The dependency tree 600 is for a target module 602 that is to be compiled and may be generated as described above by performing a static analysis of source code of the target module 602. Dependency tree 600 shows that target module 602 has two first order dependencies 604A, 604B. Further, first order dependency A 604A is dependent on first order dependency B 604B. Accordingly, when creating module stubs for target module 602, a module stub for first order dependency B 604B should be created first to ensure the first order dependencies are traversed in topological order.

Dependency tree 600 also shows that target module 602 has three indirect dependencies 606A, 606B, 606C. First order dependency A 604A depends on indirect dependency A 606A and indirect dependency B 606B, and first order dependency B 604B depends on indirect dependency C 606C. When static code analysis is performed for first order dependency A 604A, all type references to indirect dependency A 606A and indirect dependency B 606B are removed from the source code of first order dependency A 604A. When static code analysis is performed for first order dependency B 604B, all type references to indirect dependency C 606C are removed from the source code of first order dependency B 604B.

The foregoing disclosure describes a number of examples for distributed compilation of statically typed languages. In this manner, the examples disclosed herein distributed compilation of statically typed languages by using module stubs to compile a target module, where the module stubs are compilations of first order dependencies that have been cleansed of references to indirect dependencies of the target module.

We claim:

1. A system for providing distributed compilation of statically typed languages, the system comprising:
a processing resource; and
a memory resource comprising instructions that when executed by the processing resource cause the processing resource to:

identify, in source code of a target module, a plurality of first order dependencies of the target module and indirect dependencies of the target module, wherein the plurality of first order dependencies are modules that the target module directly depends upon, and the indirect dependencies are modules that the target module indirectly depends upon via the first order dependencies;

traverse each of the plurality of first order dependencies to remove, from the source code of the target module, code references to the indirect dependencies of the target module;

compile the source code of the removed indirect dependencies to generate a plurality of module stubs, wherein the plurality of module stubs includes references to the first order dependencies without the indirect dependencies; and compile the source code of the target module using the plurality of module stubs to generate a target program.

2. The system of claim 1, wherein the instructions are to cause the processing resource to:

send a request to compile at least one module of the plurality of first order dependencies to a remote computing device, wherein the at least one module is compiled by the remote computing device to generate a compiled dependency, and wherein the compilation of the at least one module by the remote computing device is in parallel with the compilation of the target module by the processing resource.

3. The system of claim 2, wherein the instructions are to cause the processing resource to:

receive the compiled dependency from the remote computing device; and execute the target program using the compiled dependency.

4. The system of claim 2, wherein one of the plurality of module stubs is semantically equivalent to the compiled dependency with respect to the target module.

5. The system of claim 1, wherein the instructions are to cause the processing resource to:

sort the plurality of first order dependencies to generate a module topology, wherein the plurality of first order dependencies are traversed according to the module topology.

6. The system of claim 1, wherein the source code is written in a programming language that couples dependency metadata of the target module to an implementation of the target module.

7. A method for providing distributed compilation of statically typed languages, the method comprising:

identify, in source code of a target module, a plurality of first order dependencies of the target module and indirect dependencies of the target module, wherein the plurality of first order dependencies are modules that the target module directly depends upon, and the indirect dependencies are modules that the target module indirectly depends upon via the first order dependencies;

identifying, by a processor of a first computing device, in source code of a target module, a plurality of first order dependencies of the target module and indirect dependencies of the target module, wherein the plurality of first order dependencies are modules that the target module directly depends upon, and the indirect dependencies are modules that the target module indirectly depends upon via the plurality of first order dependencies;

traversing, by the processor, each of the plurality of first order dependencies to remove code references to the indirect dependencies of the target module from the source code of the target module;

compiling, by the processor, the source code of the removed indirect dependencies to generate a plurality of module stubs, wherein the plurality of module stubs includes references to the first order dependencies without the indirect dependencies; and compiling, by the processor, the source code of the target module using the plurality of module stubs to generate a target program.

8. The method of claim 7, further comprising:

sending a request to compile at least one module of the plurality of first order dependencies to a remote computing device, wherein the remote computing device is to compile the at least one module to generate a compiled dependency in parallel with the compilation of the target module by the first computing device;

receiving, by the processor of the first computing device, the compiled dependency from the remote computing device; and executing, by the processor of the first computing device, the target program using the compiled dependency.

9. The method of claim 8, wherein one of the plurality of module stubs is semantically equivalent to the complied dependency with respect to the target module.

10. The method of claim 7, further comprising:

sorting the plurality of first order dependencies to generate a module topology, wherein the plurality of first order dependencies are traversed according to the module topology.

11. The method of claim 7, wherein the source code is written in a programming language that couples dependency metadata of the target module to an implementation of the target module.

12. A non-transitory machine-readable storage medium encoded with instructions executable by a processor of a first computing device to cause the first computing device to:

identify, in source code of a target module, a plurality of first order dependencies of the target module and indirect dependencies of the target module, wherein the plurality of first order dependencies are modules that the target module directly depends upon, and the indirect dependencies are modules that the target module indirectly depends upon via the first order dependencies;

traverse each of the plurality of first order dependencies to remove, from the source code of the target module, code references to the indirect dependencies of the target module to generate a plurality of module stubs, wherein the module stubs are the plurality of first order dependencies without dependent modules;

compile the source code of the removed indirect dependencies to generate a plurality of module stubs, wherein the plurality of module stubs includes references to the first order dependencies without the indirect dependencies; and compile the source code of the target module using the plurality of module stubs to generate a target program.

13. The non-transitory machine-readable storage medium of claim 12, wherein the instructions are to cause the processor to:

send a request to compile at least one module of the plurality of first order dependencies to a remote computing device, wherein the at least one module is compiled by the remote computing device to generate a compiled dependency, and wherein the remote computing device is to compile the at least one module in parallel with the compilation of the target module by the processor of the first computing device.

14. The non-transitory machine-readable storage medium of claim 13, wherein the instructions are to cause the processor to:
   receive the compiled dependency from the remote computing device; and
   execute the target program using the compiled dependency.

15. The non-transitory machine-readable storage medium of claim 13, wherein one of the plurality of module stubs is semantically equivalent to the compiled dependency with respect to the target module.

16. The non-transitory machine-readable storage medium of claim 12, wherein the instructions are to cause the processor to:
   sort the plurality of first order dependencies to generate a module topology, wherein the plurality of first order dependencies are traversed according to the module topology.

* * * * *